United States Patent Office 3,794,675
Patented Feb. 26, 1974

3,794,675
EXTRACTION OF PROSTAGLANDINS
Ramon D. Hamilton, Portage, and William P. Schneider, Kalamazoo Township, Kalamazoo County, Mich., assignors to The Upjohn Company, Kalamazoo, Mich.
No Drawing. Continuation-in-part of abandoned application Ser. No. 71,432, Sept. 11, 1970. This application July 2, 1971, Ser. No. 159,479
Int. Cl. C07c 51/48, 67/06
U.S. Cl. 260—468 D          14 Claims

ABSTRACT OF THE DISCLOSURE

An improvement in a process for isolating prostanoic acid derivatives, including $PGA_2$, $PGA_2$ methyl ester, $PGA_2$ acetate methyl ester, and their 15β-epimers from marine invertebrates. The products are useful for pharmacological purposes and as intermediates for the preparation of other prostanoic acid derivatives with pharmacological uses.

CROSS-REFERENCE TO RELATED APPLICATIONS

This application is a continuation-in-part of our copending application Ser. No. 71,432, filed Sept. 11, 1970, now abandoned.

DESCRIPTION OF THE INVENTION

This invention relates to novel methods of preparing prostanoic acid derivatives.

This invention relates to a process for producing a compound of the formula:

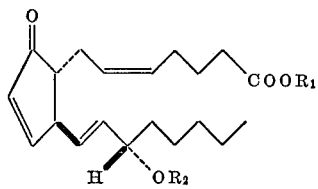

wherein $R_1$ and $R_2$ are both hydrogen, or wherein $R_1$ is methyl and $R_2$ is hydrogen or acetyl, which comprises extracting colonies or colony pieces of the marine invertebrate *Plexaura homomalla* (Esper), 1792, forma S, with a solvent and separating said compound from the resulting extract.

This invention further relates to an improvement in the process for extracting 15β-$PGA_2$ acetate methyl ester from colonies or colony pieces of the marine invertebrate *Plexaura homomalla* (Esper), 1792, forma R, or in a process for extracting $PGA_2$ acetate methyl ester from colonies or colony pieces of the marine invertebrate *Plexaura homomalla* (Esper), 1792, forma S, wherein said colonies or colony pieces are cooled to a temperature at least as low as +5° C. within one hour after removal of said colonies from their growing site, said colonies or colony pieces being maintained at a temperature at least as low as +5° C. until the time they are extracted with a neutral organic liquid.

This invention further relates to an improvement in the process for extracting prostanoic acid derivatives from colonies or colony pieces of the marine invertebrate *Plexaura homomalla* (Esper), 1792, forma S or the marine invertebrate *Plexaura homomalla* (Esper), 1792, forma R, wherein said colonies or colony pieces, prior to extraction, are maintained in contact with water in a temperature range up to 50° C. until substantially all of the C-15 acetates of the prostanoic acid derivatives originally present in the colonies or colony pieces are transformed to C-15 hydroxy prostanoic acid derivatives.

In particular, the several aspects of this invention relate to derivatives of prostanoic acid which has the following structure and numbering:

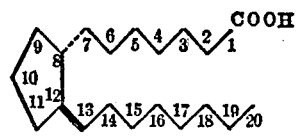

Some of the derivatives of prostanoic acid are known as prostaglandins. One of those, prostaglandin $E_2$ ($PGE_2$), has the following formula:

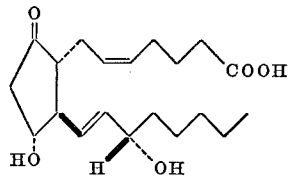

II

Another, prostaglandin $F_{2\alpha}$ ($PGF_{2\alpha}$), has the formula:

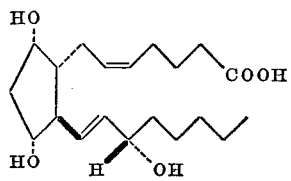

III

Still another, prostaglandin $F_{2\beta}$ ($PGF_{2\beta}$), has the formula:

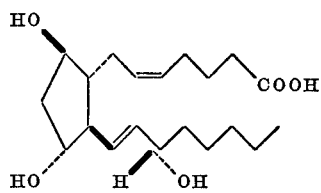

IV

Encompassed by Formula I are the prostanoic acid derivatives known as prostaglandin $A_2$ and its esters, namely $PGA_2$ ($R_1$ and $R_2$ are hydrogen), $PGA_2$ methyl ester ($R_1$ is methyl and $R_2$ is hydrogen), and $PGA_2$ acetate methyl ester ($R_1$ is methyl and $R_2$ is acetyl). These are known compounds, known to be useful for pharmacological purposes. See, for example, British specification No. 1,097,533 and Bergstrom et al., Pharmacol. Rev. 20, 1 (1968). These Formula-I compounds are also useful as intermediates for the preparation of other prostanoic acid derivatives with pharmacological uses.

In Formulas I to IV and in the formulas recited hereinafter in the specification and claims, broken line attachments to the cyclopentane ring indicate substituents in alpha configuration, i.e., below the plane of the cyclopentane ring. Heavy solid line attachments to the cyclopentane ring indicate substituents in beta configuration, i.e., above the plane of the cyclopentane ring.

The side-chain hydroxy at C-15 in Formulas I to IV is in S (alpha) configuration. That configuration is shown by attachment of said side-chain hydroxy to C-15 with a dotted line and hydrogen with a heavy solid line. The alternative configuration for the side-chain hydroxy at C-15 is known as R or epi (beta), and is shown when necessary by attachment of said side-chain hydroxy to C-15 with a heavy solid line and hydrogen with a dotted line, thus

The prostaglandin corresponding to $PGE_2$ (Formula II) but with the R or epi configuration at C-15 will be designated 15β-PGE₂. See Nature, 212, 38 (1966) for discussion of the stereochemistry of the prostaglandins.

These conventions regarding formulas, names, and symbols for derivatives of prostanoic acid apply to the formulas, names, and symbols given hereinafter in the specification and claims. When reference is made hereinafter to the compounds of Formulas I to IV, by the symbos $PGA_2$, $PGE_2$, $PGF_{2\alpha}$, or $PGF_{2\beta}$, or to the methyl esters of any of those, 15(S) configuration will be intended and by established custom, "S" will not be mentioned in the name or symbol. For all of the other compounds recited hereinafter, the configuration at C–15 will be identified in the name as "15β" when in the 15(R) or 15-epi configuration.

Molecules of the known prostaglandins each have several centers of asymmetry, and can exist in racemic (optically inactive) form and in either of the two enantiomeric (optically active) forms, i.e., the dextrorotatory and levorotatory forms. As drawn, Formulas I to IV each represent the particular optically active form of the prostaglandin which is obtained from certain mammalian tissues, for example, sheep vesicular glands, swine lung, or human seminal plasma, or by carbonyl and/or double bond reduction of a prostaglandin so obtained. See, for example, Bergstrom et al., Pharmacol. Rev. 20, 1 (1968) and references cited therein.

The several aspects of this invention, then, relate to novel and improved methods of extracting and separating $PGA_2$, $PGA_2$ methyl ester, and $PGA_2$ acetate methyl ester from Plexaura homomalla (Esper), 1792, forma S, and 15β–$PGA_2$, 15β–$PGA_2$ methyl ester, and 15β–$PGA_2$ acetate methyl ester from Plexaura homomalla (Esper), 1792, forma R. These procedures will be discussed below and illustrated in the examples. Also discussed below, together with Charts A–E, and illustrated in the preparations will be the transformations of these $PGA_2$ and 1-5β–$PGA_2$ compounds to other prostaglandins, particularly $PGE_2$, $PGF_{2\alpha}$, and $PGF_{2\beta}$. These transformations are not part of the present invention but are illustrative of the utility of this invention.

The known prostanoic acid derivatives, $PGE_2$, $PGF_{2\alpha}$, and $PGF_{2\beta}$, and their esters and pharmacologically acceptable salts, are extremely potent in causing various biological responses. For that reason, these compounds are useful for pharmacological purposes. See, for example, Bergstrom et al., Pharmacol. Rev. 20, 1 (1968), and references cited therein. A few of those biological responses are vaso-depressor activity in the case of the $PGE_2$, $PGF_{2\beta}$, and $PGA_2$ compounds as measured, for example, in anesthetized (pentobarbital sodium) pentolinium-treated rats with indwelling aortic and right heart cannulas; pressor activity, similarly measured, for the $PGF_{2\alpha}$ compounds; stimulation of smooth muscle as shown, for example, by tests on strips of guinea pig ileum, rabbit duodenum, or gerbil colon; potentiation of other smooth muscle stimulants; antilipolytic activity as shown by antagonism of epinephrine-induced mobilization of free fatty acids or inhibition of the spontaneous release of glycerol from isolated rat fat pads; inhibition of gastric secretion in the case of the $PGE_2$ and $PGA_2$ compounds as shown in dogs with secretion stimulated by food or histamine infusion; activity on the central nervous system; controlling spasm and facilitating breathing in asthmatic conditions; decrease of blood platelet adhesiveness as shown by platelet-to-glass adhesiveness, and inhibition of blood platelet aggregation and thrombus formation induced by various physical stimuli, e.g., arterial injury, and various biochemical stimuli, e.g., ADP, ATP, serotonin, thrombin, and collagen; and in the case of the $PGE_2$ compounds, stimulation of epidermal proliferation and keratinization as shown when applied in culture to embryonic chick and rat skin segments.

Because of these biological responses, these known prostaglandins are useful to study, prevent, control, or alleviate a wide variety of diseases and undesirable physioligical conditions in birds and mammals, including humans, useful domestic animals, pets, and zoological specimens, and in laboratory animals, for example, mice, rats, rabbits, and monkeys. With particular regard to $PGE_2$ see, for example, Karim et al., Br. Med. J. 3, 198–200 (1970), and J. Obstet. Gynaec. Br. Commonw. 77, 200–210 (1970); as to $PGFF_{2\alpha}$ see, for example, Wigvist et al. The Lancet 889 (1970), and Karim et al., Lancet 1, 157–159 (1970) and J. Obstet. Gynaec. Brit. Commonw. 76, 769 (1969); as to $PGA_2$ see, for example, British specification 1,097,533.

For example, these compounds, especially the $PGE_2$ compounds, are useful in mammals, including man, as nasal decongestants; the $PGE_2$ and $PGA_2$ compounds are useful to reduce and control excessive gastric secretion, thereby reducing or avoiding gastrointestinal ulcer formation, and accelerating the healing of such ulcers already present in the gastrointestinal tract; the $PGE_2$ compounds are extremely potent in causing stimulation of smooth muscle; the $PGE_2$ and $PGF_{2\beta}$ compounds are useful as hyptotensive agents to reduce blood pressure in mammals, including man; the $PGA_2$ compounds increase the flow of blood in the mammalian kidney, thereby increasing volume and electrolyte content of the urine; the $PGE_2$, $PGF_{2\alpha}$, and $PGF_{2\beta}$ compounds are useful for labor induction and abortion in pregnant female animals, including humans. For these purposes, these compounds are administered by the usual intravenous, intramuscular, or subcutaneous injection or infusion methods.

The various $PGE_2$, $PGF_{2\alpha}$, $PGF_{2\beta}$, and $PGA_2$ acids are readily converted to esters or pharmacologically acceptable salts, for purposes of administration, by methods known in the art.

As stated above, the Formula I $PGA_2$ compounds are known in the art. Considering the corresponding 15β–$PGA_2$ compounds, both 15β–$PGA_2$ acetate methyl ester and 15β–$PGA_2$ are known in the art. See, for example Weinheimer et al., Tetrahedron Letters, No. 59, 5185 (1969); and H. W. Youngken, Jr. (ed.), "Food-Drugs From the Sea," Proc. Marine Technology Society, pp. 311–314 (1969).

The compounds of Formula I and the two 15β–$PGA_2$ compounds above are obtained by extraction from two forms of a marine invertebrate. The Formula I $PGA_2$ compounds are obtained from colonies of Plexaura homomalla (Esper), 1792, forma S; the 15β–$PGA_2$ compounds are obtained from colonies of Plexaura homomalla (Esper), 1792, forma R. It has been reported that 15β–$PGA_2$ and 15β–$PGA_2$ acetate methyl ester are present in the air-dried cortex of Plexaura homomalla to the extent of 0.2% and 1.3%, respectively. See Weinheimer et al. cited above.

The Plexaura homomalla forms are members of the subclass Octocoorallia, order Gorgonacea, suborder Holaxonia, family Plexauridae, genus Plexaura. See, for example, Bayer, "The Shallow-Water Octocorallia of the West Indian Region," Martinus Nijhoff, The Hague (1961). Colonies of these Plexaura homomalla forms are abundant on the ocean reefs in the zone from the low-tide line to about 25 fathoms in the tropical and subtropical regions of the western part of the Atlantic Ocean, from Bermuda to the reefs of Brazil, including the eastern shore reefs of Florida, the Caribbean island and mainland reefs, and the Gulf of Mexico island and mainland reefs. These colonies are bush-like or small tree-like in habit, and are readily identified for collection as Plexaura homomalla (Esper), 1792, by those of ordinary skill in this art. One method of distinguishing the "S" form from the "R" form is described below in Preparation 1.

The colonies of these two forms of Plexaura homomalla are easily separated into an outer bark-like cortex and an inner wiry proteinaceous stem or skeleton. Symbiotic algae or Zooxanthellae are also present in the colonies.

The choice of isolation or extraction method is determined by the particular $PGA_2$ (Formula I) or $15\beta$-$PGA_2$ type compound desired. Thus of $PGA_2$ acetate methyl ester, $PGA_2$ methyl ester, and $PGA_2$ are desired, freshly collected or air-dried "S"-form colonies or colony pieces are extracted; for maximum convenience and maximum yield of either $PGA_2$ acetate methyl ester or $15\beta$-$PGA_2$ acetate methyl ester, the respective "S" or "R"-form colonies or colony pieces, freshly collected, are frozen prior to extraction. If mainly $PGA_2$ or $15\beta$-$PGA_2$ is desired, the respective "S" or "R"-form colonies or colony pieces are maintained in contact with water until free of C–15 acetates, with optional freezing before or after maintaining in contact with water.

Prior to extracting the Formula I products, the freshly collected colonies or colony pieces are advantageously broken or chopped into smaller pieces, preferably less than 2 grams in weight, prior to extraction. For some extraction systems it is desirable to subdivide the colony pieces to give a surface area increase in the range 100 to 100,000 times the surface area of an equal weight of colonies.

Alternatively, the colonies or colony pieces are air-dried before extraction. When that is done, it is advantageous to separate the thick bark-like cortex from the wiry proteinaceous skeleton, and then pulverize the cortex before extraction. The major amount of the Formula I compounds is in said cortex.

The extraction solvents are any of the usual neutral organic liquids used for extraction purposes, for example hydrocarbon, halogenated hydrocarbons, lower alkanols, ketones and esters. Preferably, the solvent has a boiling point below about 100° C. Examples of preferred solvents are benzene, dichloromethane, methanol, ethanol, acetone, and ethyl acetate.

Separation of the Formula I products from the extract is done by methods known in the art, for example liquid-liquid extraction or silica gel chromatography.

Since the invention of the novel and improved processes for producing the Formula I compounds and their $15\beta$-epimers, it has now been found that small amounts of the 5,6-trans compounds of $PGA_2$ and $15\beta$-$PGA_2$ and their methyl esters and acetate methyl esters are also obtained from *Plexaura homomalla* (Esper), 1792, forms R and S. These 5,6-trans compounds are extracted with and accompany the corresponding $PGA_2$-type compounds through many of their transformations. For example, $PGA_2$ containing 5,6-trans-$PGA_2$ yields a mixture of $PGE_2$ and 5,6-trans-$PGE_2$ by the process represented in Chart E below.

When it is desired, for pharmacological purposes, to prepare the major products of this invention free of 5,6-trans compounds, those 5,6-trans compounds are separated either from the starting reactants or from the products. In either case, several methods are available for separating the 5,6-trans-$PG_2$ compounds from the $PG_2$ compounds. One method is by means of a silver-saturated ion-exchange resin (for example, see E. A. Emken et al., J. Am. Oil Chemists' Soc. 41, 388 (1964)), illustrated below in Preparation 2. The other method is by preferentially forming a mercuric acetate adduct of the 5,6-cis compound which is extractable into polar solvents illustrated below in Preparation 3. Accordingly, the removal of 5,6-trans-$PGA_2$ acetate methyl ester from $PGA_2$ acetate ester is done advantageously by the procedure of Preparation 3 below.

For maximum yield of either $PGA_2$ acetate methyl ester or $15\beta$-$PGA_2$ acetate methyl ester, there is now an improvement in the process of extracting colonies or colony pieces of either *Plexaura homomalla* (Esper), 1792, forma S or *Plexaura homomalla* (Esper), 1792, forma R, respectively.

In this improved process, said colonies or colony pieces are cooled to a temperature at least as low as $+5°$ C. within about one hour after removal of said colonies from their growing site, said colonies or colony pieces being maintained at a temperature at least as low as $+5°$ C. until the time they are extracted with a neutral organic liquid.

When these colonies or colony pieces are treated in this manner, a surprising and unexpected difference is observed in the composition of the prostanoic acid derivative mixture which is extracted, compared with the prior art. For example, Weinheimer et al., cited above, disclose the isolation of one part of $15\beta$-$PGA_2$ and 6.5 parts of $15\beta$-$PGA_2$ acetate methyl ester from the air-dried cortex of *Plexaura homomalla* colonies. By using the novel improvement of this invention, a substantially smaller ratio of hydroxy compound to acetate compound is obtained. For example, in Example 3, below, a ratio of about 1 part of hydroxy compound to about 25 parts of acetate compound is obtained. This unexpected result is attained using the novel improvement of this invention with colonies or colony pieces of both *Plexaura homomalla* (Esper), 1792, forma R and *Plexaura homomalla* (Esper), 1792, forma S. This result is desirable when the acetate compound is desired as an intermediate.

A temperature below about $+5°$ C. is readily obtained by a mixture of ice and water, and it is convenient to immerse the colonies or colony pieces in that mixture as soon as convenient after the colonies are removed from their growing site. However, in a preferred embodiment of this process improvement, all or part of the cooling is done at a temperature below about $-20°$ C. Thus, the colonies or colony pieces are actually frozen and kept frozen until the time for extraction. Preferably, the colonies or colony pieces are frozen to below about $-20°$ C. within about one hour after removal from the growing site, and are maintained below about $-20°$ C. until the time for extraction.

In another preferred embodiment of this process improvement, the colonies or colony pieces are frozen by contact with solid carbon dioxide (Dry Ice) or are placed in a container which contains solid carbon dioxide, the resulting frozen colonies or colony pieces being maintained in contact with said carbon dioxide or at an equivalent temperature until the time for extraction.

The frozen colonies or colony pieces are advantageously broken or chopped into smaller pieces, preferably less than 2 grams in weight, prior to extraction. For some extraction systems it is desirable to grind the colony pieces in a hogger to a particle size with the largest dimension about 5 mm. The degree of subdivision is selected according to several factors, for example, the manner in which the solids are contacted by the extracting liquid, whether by percolation through a static bed or by agitation and stirring, the contacting time, the nature and viscosity of the solvent, and the like.

The neutral organic liquid used to extract the colonies or colony pieces is any of the usual organic solvents, preferably one with a boiling point below about 100° C. and with moderate to high polarity. Especially preferred liquids for this extraction are dichloromethane, methanol, and ethanol. Unnecessarily prolonged contact of the colonies or colony pieces with a hydroxylic organic solvent, e.g., methanol or ethanol, should, however, be avoided since some of the desired acetate may be transformed in the solvent to the corresponding hydroxy compound. An optimum duration of extraction is readily determined by those of ordinary skill in this art, for example by repeated extraction of a small amount of colony pieces with fresh portions of the solvent to determine how much time is required for substantially complete extraction. The extraction temperature is not critical as long as the extraction is not done at a temperature so high that the desired products are decomposed. Extraction in the temperature range 5° to 30° C. is usually satisfactory.

The prostanoic acid derivatives are isolated from the extract and are separated from each other by procedures known in the art. Those procedures are exemplified below in the examples.

For maximum yield of either $PGA_2$ or $15\beta\text{-}PGA_2$, there is now an improvement in the process of extracting colonies or colony pieces of either *Plexaura homomalla* (Esper), 1792, forma S or *Plexaura homomalla* (Esper), 1792, forma R, respectively. In this improved process said colonies or colony pieces, prior to extraction, are maintained in contact with water in a temperature range up to 50° C. until substantially all of the C-15 acetates of the prostanoic acid derivatives originally present in the colonies or colony pieces are transformed to C-15 hydroxy prostanoic acid derivatives.

The water referred to above may be cell water, i.e. water within the internal structure of the marine invertebrate, water within the endoderm structure and the spicules, water adhering to the colonies as they are collected, or water added for the purpose of increasing the yield of $PGA_2$ or $15\beta\text{-}PGA_2$. With regard to the natural internal water of these forms of *Plexaura homomalla* (Esper), 1792, about one-half of a colony weight consists of internal water as shown by heating both the cortex or outer bark and the wiry proteinaceous skeleton separately at 50° C. and 0.2 mm. pressure for 24 hours, and then at 50° C. and atmospheric pressure for an additional 48 hours. The quantity of water present during the period wherein all of the C-15 acetates are transformed to C-15 hydroxy derivatives is at least equal in weight to the dry solids content of the colonies or colony pieces. To prevent loss of the water by evaporation, the colonies or colony pieces are either enclosed in containers or submerged.

In one embodiment of this process improvement, for convenience in breaking the colonies to smaller pieces, the colonies or colony pieces are frozen prior to chopping or grinding. This is done by methods known in the art.

For some reason not fully understood, superior results as to yield of $PGA_2$ or $15\beta\text{-}PGA_2$ are obtained if, after the colonies or colony pieces are maintained in water until the C-15 acetates are transformed to C-15 hydroxy derivatives, said colonies or colony pieces are frozen and thawed prior to extraction. In their frozen condition the colonies or colony pieces may be stored conveniently without gross deterioration or undesirable chemical transformations and side-reactions.

During their period of transformation of C-15 acetates to C-15 hydroxy derivatives, the mixture of colonies or colony pieces in contact with water, some of which may be added water, are maintained in the range 20° to 40° C. until the desired chemical change takes place. At higher temperatures, i.e., above about 50° C., the chemical change takes place more rapidly, but there is a possibility that some degradation of the desired product takes place. At lower temperatures, i.e., down to about 5° C., the desired chemical change takes place more slowly. At about 25° C., the desired reaction is substantially complete within about 15 to 20 hours.

Completion of the desired reaction, i.e., transformation of substantially all of the C-15 acetates of the prostanoic acid derivatives originally present in the colonies or colony pieces to C-15 hydroxy prostanoic acid derivatives is readily determined by removing a colony piece or a few small pieces and extracting those with methanol. This methanol extract is subjected to thin layer chromatography with the A-IX system. Eventual substantial absence of the 15-acetates is readily observed.

As mentioned above, the principal prostanoic acid derivatives in these two forms of *Plexaura homomalla* are $PGA_2$ acetate methyl ester and 15-epi-$PGA_2$ acetate methyl ester. The process improvement described above changes substantially all of the acetate moieties to hydroxy moieties. At the same time, most of the carboxymethyl moieties, i.e., $-COOCH_3$, are changed to carboxyl moieties, i.e., $-COOH$. Usually, however, at the time substantially all of the acetate moieties have been changed to hydroxy moieties, a small amount of 15-hydroxy methyl esters is still present. If desired, the mixture of water and thawed colonies or colony pieces can be maintained in the range up to 50° C. until those 15-hydroxy methyl esters are transformed to 15-hydroxy acids. But the amounts of 15-hydroxy methyl esters remaining are usually small, and the esters are easily separated from the 15-hydroxy acids. Therefore it is optional in this process improvement whether one continues maintaining the thawed colonies or colony pieces beyond the point where 15-acetate compounds are substantially absent.

When the desired transformation of 15-acetate compounds to 15-hydroxy compounds is substantially complete, the hydroxy acids and hydroxy methyl esters are isolated from the colonies and colony pieces and from the water which is also present by suitable extraction techniques. For this purpose it is preferred that a water-miscible organic liquid be used, for example, a lower alkanol such as methanol or ethanol, or a ketone such as acetone, preferably with a boiling point below about 100° C.

The solution of the extract and organic liquid is concentrated, preferably at temperatures below about 50° C., as with reduced pressure. If foaming is troublesome, an antifoam agent is added, for example a polypropylene glycol, lard oil, soybean oil, a silicone, or other material useful for this purpose as known in the art.

As with the other Formula I compounds and their $15\beta$-epimers above, the separation of $PGA_2$ or $15\beta\text{-}PGA_2$ from the extract is done by methods known in the art, for example silica gel chromatography. Likewise, the corresponding 5,6-trans compounds are separated by the methods disclosed above, for example using a silver resin column.

An alternate route to $PGA_2$ or $15\beta\text{-}PGA_2$ is from the corresponding methyl esters and 15-acetate methyl esters after those have been extracted from the *Plexaura homomalla* colonies or colony pieces as described above. A suitable method for removing the acetyl group of the Formula I 15-acetate methyl ester of its $15\beta$-epimer comprises mixing the acetate methyl ester in lower alkanol solution, preferably in methanol solution, with a strong acid, e.g., perchloric acid, for about 15 hours at 25° C. A suitable method for removing the methyl group of the Formula I methyl ester or its $15\beta$-epimer is the enzymatic hydrolysis described in West Germany Offenlegungschrift No. 1,937,912, reprinted in Farmdoc Complete Specifications, Book No. 14, No. 6869R, Week $R_5$, Mar. 18, 1970.

Transformations of the above $PGA_2$ and $15\beta\text{-}PGA_2$ compounds to other prostaglandins, e.g. $PGE_2$, $PGF_{2\alpha}$, and $PGF_{2\beta}$, or their $15\beta$-epimers are discussed below, but are not part of the present invention.

When PGE-type compounds are desired, the PGA-type compounds of Formula I and their $15\beta$-epimers are transformed by the chemical reactions shown generically in Chart A.

In Chart A, $R_3$ is hydrogen, methyl, or $-Si-(A)_3$ wherein A is alkyl of one to 4 carbon atoms, inclusive, aralkyl of 7 to 12 carbon atoms, inclusive, phenyl, or phenyl substituted with one or 2 fluoro, chloro, or alkyl of one to 4 carbon atoms, inclusive; G is

or

wherein $R_4$ is hydrogen, acetyl, or $-Si-(A)_3$ when $R_3$ is hydrogen or methyl, and $R_4$ is $-Si-(A)_3$ when $R_3$ is $-Si-(A)_3$; $R_1$ is hydrogen or methyl; and B is

or

CHART A

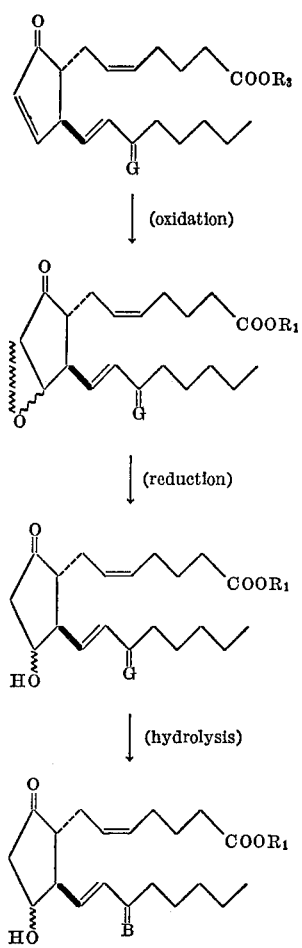

Thus, Formula V in Chart A encompasses the compounds of Formula I and their 15β-epimers obtained from *Plexaura homomalla*, and also compounds of the formula:

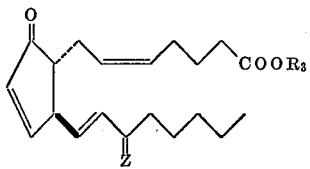

wherein $R_3$ is as defined above, and Z is

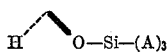

or

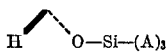

wherein A is as defined above.

In Formula VI, of Chart A,

indicates attachment of the epoxy oxygen to the ring in alpha or beta configuration. In Formulas VII and VIII of Chart A, ~ indicates attachment of hydroxy to the ring in alpha or beta configuration.

It will be observed in Chart A that the Formula VII and VIII products each encompass four stereoisomeric groups of compounds. Included are compounds with the 11α,15(S) configuration of PGE₂ (Formula II, above), and compounds with the configuration of 11α,15β-PGE₂ as obtained from *Plexaura homomalla* (Esper), 1792, forma R. If the Formula VII or VIII product is to have the 15(S) configuration, e.g., PGE₂, then the Formula V starting material should have the 15(S) configuration, i.e., G should be

If a 15β compound of Formula VII or VIII is desired, e.g., 15β-PGE₂, then the Formula V starting material should have the 15β configuration, i.e., G should be

As described above, Formula V starting materials wherein $R_3$ is hydrogen or methyl and G is

i.e. with the 15(S) configuration, are obtained from *Plexaura homomalla* (Esper), 1792, forma S. Those same compounds are also produced by reacting the corresponding 15β compound with a hydrocarbyl or halohydrocarbyl sulfonyl chloride or bromide, preferably a lower alkyl-sulfonyl chloride or bromide, especially methanesulfonyl chloride or bromide, or a benzene- or substituted-benzene-sulfonyl chloride or bromide, e.g., p-toluenesulfonyl chloride. This reaction is done in the presence of at least sufficient tertiary amine, e.g., triethylamine, to absorb the hydrogen chloride or hydrogen bromide byproduct, and at a low temperature, preferably in the range —15° to +15° C. The presence of an inert liquid diluent, e.g., tetrahydrofuran, is helpful to maintain a mobile homogeneous reaction mixture. At 0° C. and with methanesulfonyl chloride, usually 30 to 60 minutes is a sufficient reaction time. The product is a mixture of 15(S) (alpha) product and 15(R) (beta) starting material. These are separated by procedures known in the art, and the 15(S) product is purified by procedures known in the art, advantageously by chromatography on silica gel. This reaction is also used to transform 15(S) Formula I materials wherein $R_1$ is hydrogen or methyl and $R_2$ is hydrogen to the corresponding 15(R) compounds. In each case, a mixture of 15(R) product and 15(S) starting material is obtained, the components of which are separated as described above.

Referring again to Chart A, the transformation of starting material V to epoxide VI is carried out by reacing V with any agent known to epoxidize an αβ-unsaturated ketone without reacting with isolated carbon-carbon double bonds, for example see Steroid Reactions, Carl Djerassi, ed., Holden-Day Inc., 1963, p. 593. Especially preferred are aqueous hydrogen peroxide or an organic tertiary hydroperoxide. See, for example, Organic Peroxides, A. V. Tobolsky et al., Interscience Publishers, New York, 1954. For this purpose, the peroxide or hydroperoxide is employed in an amount of at least one equivalent per mole of Formula V reactant in the presence of a strong base e.g., an alkali metal hydroxide, a metal alkoxide, or a quaternary ammonium hydroxide. For example, there is employed lithium hydroxide, sodium hydroxide, potassium hydroxide, lithium ethoxide, lithium octyloxide, magnesium methoxide, magnesium isopropoxide, benzyltrimethylammonium hydroxide, tetraethylammonium hydroxide, butyltrimethylammonium hydroxide, butyldiethylphenylammonium hydroxide, benzylethyldimethylammonium hydroxide, benzyldimethyloctadecylammonium hydroxide, benzyldodecyldimethylammonium hydroxide, decyldimethylphenylammonium hydroxide, and the like. See, for example, Sidgwick, Organic Chemistry of Nitrogen, third edition, rev. by Miller and Springall, Oxford, 1966, pp. 116-127.

It is advantageous to use an intert liquid diluent in the epoxidation step to produce a mobile homogenous reaction mixture, for example, a lower alkanol, dioxane, tetrahydrofuran, dimethoxyethane, dimethylsulfoxide, or dimethylsulfone. When the alpha epoxide is preferred, tetrahydrofuran or the less polar dimethoxyethane are especially preferred as the diluent. A reaction temperature in the range −60° to 0° C. is generally preferred, especially below −10° C. The lower temperatures below −30° C. are especially preferred for favoring formation of alpha epoxide over beta epoxide. At a temperature of −20° C., the epoxidation is usually complete in 3 to 6 hours. It is also preferred that the reaction be carried out in an atmosphere of an inert gas, e.g., nitrogen, helium, or argon. When the reaction is complete as shown by the absence of starting material on TLC plates (3% acetone in dichloromethane), the reaction mixture is neutralized, and the epoxy product is isolated by procedures known in the art, for example, evaporation of the diluent and extraction of the residue with an appropriate water-immiscible solvent, e.g., ethyl acetate.

This transformation of V to VI usually produces a mixture of Formula VI alpha and beta epoxides both with either the 15(R) or 15(S) configuration depending on the configuration at C-15 in the Formula V starting material. Although these mixtures are separated into the individual alpha and beta isomers, for example, by chromatography by procedures known to be useful for separating alpha and beta epoxide mixtures, it is usually advantageous to transform the Formula VI mixture of alpha and beta epoxides to the corresponding mixture of Formula VII, II$\alpha$ and II$\beta$ hydroxy compounds. The latter mixture is then readily separated into the II$\alpha$ and II$\beta$ compounds, for example, by chromatography of silica gel.

As mentioned above, the starting materials of Formula V encompass not only the Formula I compounds and their 15$\beta$-epimers obtained from *Plexaura homomalla* but also the silyl compounds of Formula Va. When desired as reactants, these silyl compounds are prepared by silylation of PGA$_2$, 15$\beta$-PGA$_2$, or the methyl esters of those. These silylations are carried out by procedures known in the art. See, for example, Pierce, "Silylation of Organic Compounds", Pierce Chemical Co., Rockford, Ill. (1968). The C-15 hydroxy group of PGA$_2$, 15$\beta$-PGA$_2$, or their methyl esters is transformed to a —O—Si(A)$_3$ moiety wherein A is as defined above, sufficient silylating agent being used according to known procedures to accomplish that. The necessary silylating agents for this purpose are known in the art or are prepared by methods known in the art. See, for example, Post, "Silicones and Other Organic Silicon Compounds," Reinhold Publishing Corp., New York, N.Y. (1949). In the case of PGA$_2$ and 15$\beta$-PGA$_2$, excess silylating agent and prolonged treatment also transform the —COOH to —COO—Si—(A)$_3$. It is optional in transforming V to VI whether or not this —COOH of PGA$_2$ or 15$\beta$-PGA$_2$ is esterified to —COO—Si—(A)$_3$, since that ester group is transformed to —COOH during formation and isolation of the Formula VI epoxide product.

The various A's of a —Si—(A)$_3$ are alike or different. For example, a —Si—(A)$_3$ can be trimethylsilyl, dimethylphenylsilyl, or methylphenylbenzylsilyl.

When it is desired to retain the —Si—(A)$_3$ moiety at C-15 in the Formula VI epoxide product, for example, to give steric control in a subsequent reaction, it is important in isolating the epoxide that the presence of acid be avoided and that contact with water be minimized unless the water is kept cold, i.e., below about 10° C.

Referring again to Chart A, the transformation of epoxide VI to hydroxy compound VII is accomplished by reduction with chromium (II) salts, e.g., chromium (II) chloride or chromium (II) acetate. Those salts are prepared by methods known in the art, e.g., Inorganic Syntheses, VIII, 125 (1966); ibid. VI, 144 (1960); ibid. III, 148 (1950); ibid. I, 122 (1939); and references cited in those. This reduction is carried out by procedures known in the art for using chromium (II) salts to reduce epoxides of $\alpha\beta$-unsaturated ketones to $\beta$-hydroxy ketones. See, for example, Cole et al., J. Org. Chem. 19, 131 (1954), and Neher et al., Helv. Chem. Acta 42, 132 (1959). In these reactions, the absence of air and strong acids is desirable. If it is desired to maintain a —Si—(A)$_3$ moiety on C-15, a neutral reaction mixture is preferred. An especially preferred procedure is to generate the chromium (II) ion in the presence of the Formula VI epoxide, for example, by mixing the epoxide with a chromium (III) salt, e.g., the chloride, with metallic zinc in the presence of acetic acid. The desired Formula VII compound is isolated from the reduction reaction mixture by methods known in the art, care being taken to minimize contact of the product with acid and water, especially warm water, when retention of a —Si—(A)$_3$ at C-15 is desired.

Unexpectedly, amalgamated aluminum metal has also been found to be useful as a reducing agent in place of chromium (II) salts to transform Formula VI epoxides to Formula VII hydroxy compounds. Amalgamated aluminum is prepared by procedures known in the art, for example, by contacting aluminum metal in the form of foil, thin sheet, turnings, or granules with a mercury (II) salt, for example, mercuric chloride, advantageously in the presence of sufficient water to dissolve the mercury (II) salt. Preferably, the surface of the aluminum metal is free of oxide. That is readily accomplished by physical removal of the usual oxide layer, e.g., by abrasion or scraping, or chemically, e.g., by etching with aqueous sodium hydroxide solution. It is only necessary that the aluminum surface be amalgamated. The amalgamated aluminum should be freshly prepared, and maintained in the absence of air and moisture until used.

The reductive opening of the Formula VI epoxide ring is accomplished by contacting said epoxide with the amalgamated aluminum in the presence of a hydroxylic solvent and sufficient inert organic liquid diluent to give a mobile and homogeneous reaction mixture with respect to the hydroxylic solvent and said epoxide. Among hydroxylic solvents, water is especially preferred although lower alkanols, e.g., methanol and ethanols are also operable.

Examples of inert organic liquid diluents are normally liquid ethers such as diethyl ether, tetrahydrofuran, dimethoxyethane, diglyme (dimethyl ether of diethylene glycol), and the like. Especially preferred is tetrahydrofuran. When a water-immiscible liquid diluent is used, a mixture of water and methanol or ethanol is especially useful in this reaction since the latter two solvents also aid in forming the desired homogeneous reaction mixture. For example, a mixture of diethyl ether and water is used with sufficient methanol to give a homogeneous reaction mixture.

The reductive opening of the epoxide is carried out by mixing a solution of the epoxide in the organic diluent with the amalgamated aluminum and the hydroxylic solvent. Since the reaction is exothermic, it is usually advantageous to cool the solution to a low temperature, e.g., minus −20° C. to 0° C., before adding the amalgamated aluminum and hydroxylic solvent and to maintain the reaction mixture in the range 20° to 30° C. by external cooling. This is especially advantageous when water is used as the hydroxylic solvent. Higher reaction temperatures are operable but not preferred when a high yield of the Formula VII products is desired. Stirring is preferred during the reaction since the reaction mixture is heterogeneous with respect to the solution and the amalgamated aluminum.

The course of the reaction is advantageously determined by withdrawing small portions of the solution and determining the presence or absence of starting material by thin layer chromatography. For example, when R$_2$ is methyl and G is

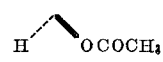

in Formulas VI and VII, a suitable TLC system is ethyl acetate-cyclohexane-acetic acid (40/60/2), the Formula VI starting material having $r_f$ 0.64, and the two Formula VII products having $r_f$ 0.25 (II$\beta$) and $r_f$ 0.20 (II$\alpha$).

The desired Formula XII hydroxy products are isolated by filtration of the reaction mixture, advantageously after addition of magnesium sulfate as a filter aid, and evaporation of the organic diluents. The Formula VII products are then hydrolyzed if desired to remove —Si—(A)$_3$ from C–15, and the II$\alpha$ and II$\beta$ products of Formula VIII are separated, if desired, by procedures known in the art, e.g., chromatography on silica gel.

The products of Formula VII are all of the PGE$_2$-type and include PGE$_2$, PGE$_2$ 15-acetate, PGE$_2$ methyl ester, PGE$_2$ 15-acetate methyl ester, PGE$_2$ and PGE$_2$ methyl ester with a —O—Si—(A)$_3$ at C–15, the corresponding 15$\beta$ compounds, and compounds corresponding to all of those wherein hydroxy is attached to C–11 in beta configuration.

Still further regarding the Formula VII and VIII compounds, either as mixture or separately, any of those is transformed to other useful compounds or mixtures by changing these PGE-type compounds to PGF-type products by reducing the ring carbonyl at C–9 to alpha hydroxy or beta hydroxy. Those transformations are shown in Chart B.

In Chart B, R$_3$ is hydrogen, methyl, or —Si—(A)$_3$, R$_1$ is hydrogen or methyl, R$_5$ is hydrogen or —Si—(A)$_3$, and G is

or

wherein R$_4$ is hydrogen or —Si—(A)$_3$ when R$_1$ and R$_3$ are hydrogen; R$_4$ is hydrogen, acetyl, or —Si—(A)$_3$ when R$_1$ and R$_3$ are methyl; and R$_4$ is —Si—(A)$_3$ when R$_3$ is —Si—(A)$_3$, wherein A is as defined above, with the proviso that when R$_4$ is —Si—(A)$_3$, R$_5$ is also —Si—(A)$_3$. Further in Chart B, B in Formula XVI is

or

and ~ indicates attachment to the cyclopentane ring in alpha or beta position.

The Chart B starting material VII is prepared as shown in Chart A. The compounds of Formula VIII in Chart A are included in Formula VII. As described above, 15$\beta$-PGE$_2$, 15$\beta$-PGE$_2$ methyl ester, and 15$\beta$-PGE$_2$ methyl ester, and 15$\beta$-PGE, methyl ester acetate are obtained from *Plexaura homomalla* (Esper), 1792, forma R. All of those compounds are encompassed by Formula VII, and thus, extraction of this form of *Plexaura homomalla* provides an alternative source of these starting materials.

Referring to Chart B, the starting material VII can be a mixture of compounds with regard to the configuration of C–11, or the starting material can be stereochemically pure with respect to C–11, depending upon whether there has been an earlier separation of II$\alpha$ and II$\beta$ isomers (see above discussion of Chart A reactions).

The transformation of PGE-type starting material VII to PGF-type product XI involves reduction of a ring carbonyl to a ring hydroxy. This process is known in the art for some of the compounds encompassed by Formula VII, i.e., when

CHART B

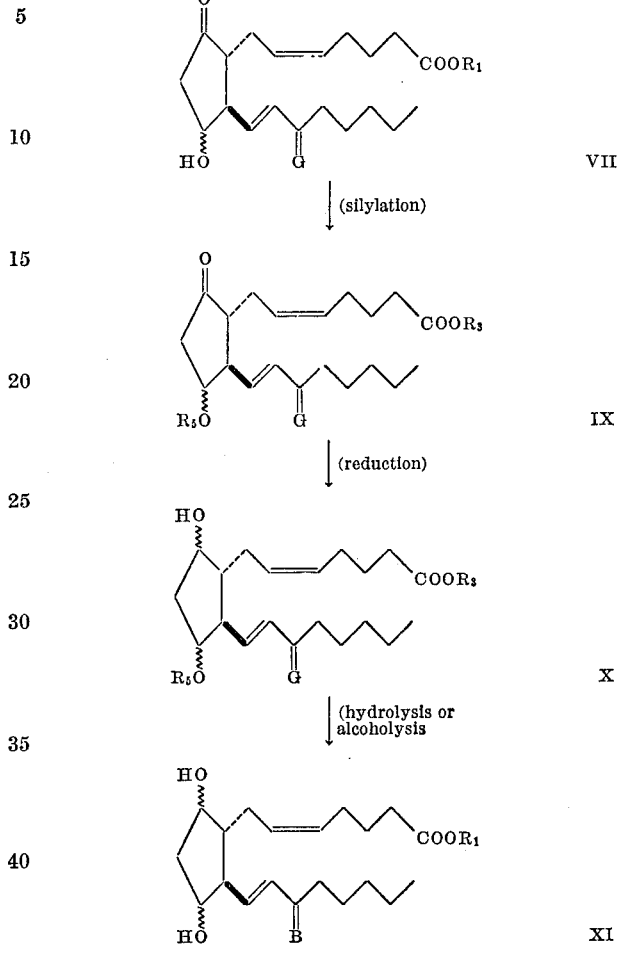

the connguration at C–11 is alpha and the configuration at C–15 is S.

For this carbonyl-to-hydroxy reduction, methods known in the art are used. See, for example, Pike et al., J. Org. Chem. 34, 3552 (1969). Use is made of any of the known ketonic carbonyl reducing agents which do not reduce ester or acid groups or carbon-carbon double bonds. Examples of those are the metal borohydrides, especially sodium, potassium, lithium, and zinc borohydrides, lithium (tri-tert-butoxy) aluminum hydride, metal trialkoxy borohydrides, e.g., sodium trimethoxyborohydride, and diisobutylaluminum hydride. The sodium, potassium, and zinc borohydrides are preferred for this reduction, especially zinc borohydride.

This carbonyl reduction usually produces a mixture of PGF$\alpha$-type and PGF$\beta$-type compounds, i.e., compounds with the alpha configuration and compounds with the beta configuration for the hydroxy at C–9. This mixture of alpha and beta isomers is separated by methods known in the art, e.g., chromatography on silica gel. See Pike et al., ibid., for example. If the Formula VII starting material is a mixture of 11$\alpha$ and 11$\beta$ isomers, then this reduction will usually produce four isomers, i.e., 9$\alpha$, 11$\alpha$, 9$\alpha$, 11$\beta$, 9$\beta$, 11$\alpha$, and 9$\beta$, 11$\beta$. Those compounds are also separated from such mixtures by silica gel chromatography.

Regarding the transformation of VII to IX in Chart B, it will be observed that the parameters for VII are such that all VII compounds are included in IX. In other words, the transformation VII to IX is an optional process step in proceeding from VII to X. The reason for this is as follows. During the reduction of IX to X, the ratio of 9α-hydroxy and 9β-hydroxy compounds formed will be different when $R_5$ in IX is hydrogen than when $R_5$ is —Si—$(A)_3$. For example, with the Formula IX compound wherein $R_3$ is hydrogen, G is

and $R_5O\sim$ represents HO- - -, i.e., 11α-hydroxy, sodium borohydride reduction gives 42 parts of the corresponding Formula X 9α-hydroxy compound, and 58 parts of the 9β-hydroxy compound. But with the Formula IX compound wherein $R_4$ is hydrogen, G is

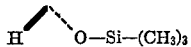

and $R_5O\sim$ represents $(CH_3)_3$—Si—O- - -, sodium borohydride reduction gives 85 parts of the corresponding Formula X 9α-hydroxy compound and 15 parts of the 9β-hydroxy compound. Similar differences are observed with the other isomers encompassed by Formula IX although not necessarily in the same direction. Accordingly, whether $R_5$ in Formula IX is to be hydrogen or —Si—$(A)_3$ depends on the particular Formula X C-9 isomer desired and the influence of silylation on the isomer ratio. For any particular Formula IX starting material, the latter is readily determined by small scale reduction with and without silylation. When silylation before carbonyl reduction is indicated, largely for economic reasons, it is preferred that A be methyl, i.e., that $R_5$ be $(CH_3)_3$—Si—.

With regard to the Formula X carbonyl reduction product (Chart B), when the method used to isolate said product does not remove any —Si—$(A)_3$ groups which may be present, that is accomplished as described above for the removal of —Si—$(A)_3$ groups from Formula VII products (Chart A, VII to VIII). Also, when G in Formula X is

or

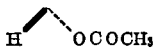

the acetyl is removed by alcoholysis also as described above for changing acetoxy at C-15 to hydroxy. These reactions are shown in Chart B as X to XI.

When $R_1$ in Formula XI is methyl and the compound wherein $R_1$ is hydrogen is desired, that methyl ester is saponified, by methods known in the art. See, for example, Just et al., J. Am. Chem. Soc. 91, 5371 (1969). This saponification also changes a C-15 acetate to a C-15 hydroxy.

The compounds encompassed by Formula XI include the known compounds $PGF_{2\alpha}$, $PGF_{2\beta}$, and the methyl esters of those. Also included in Formula XVI are the compounds 15β-$PGF_{2\alpha}$, 15β-$PGF_{2\beta}$, and the methyl esters of those.

When one of these Formula XI compounds has the R or epi configuration for the hydroxy at C-15, and the corresponding compound with the S configuration at C-15 is desired, or when one of these Formula XI compounds has the S configuration for the hydroxy at C-15, and the corresponding compound with the R or epi configuration at C-15 is desired, those desired compounds are made by the processes of Chart C. In Chart C, $R_1$, $R_3$, $R_5$, B, and $\sim$ are as defined above.

The overall process scheme of Chart C is to start with one particular C-15 isomer of a compound encompassed by Formula XI, i.e., either 15(S) or 15(R). The C-15 hydroxy of that isomer is oxidized to a ketonic carbonyl (XII). Then, after an optional silylation of the C-9 and C-11 hydroxy groups (XIII), the C-15 carbonyl is reduced back to a secondary hydroxy group. That reduction produces two C-15 hydroxy isomers, one with S configuration and one with R or epi configuration. After removal of any silyl groups, the isomers XIV and XV are separated. One of the isomers will be the same compound used as starting material (XI).

CHART C

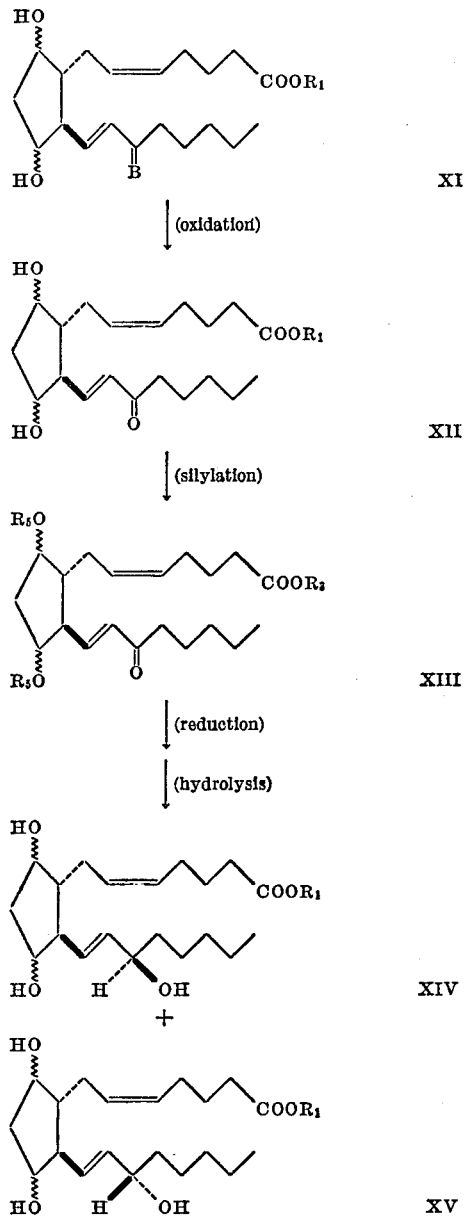

The other isomer will be the desired product. The starting material isomer is recycled to produce more of the desired isomer. This reaction scheme has previously been used to transform $PGF_{1\alpha}$ to 15β-$PGF_{1\alpha}$. See Pike et al., J. Org. Chem. 34, 3552 (1969).

Referring now to Chart C, any oxidizing agent can be used which will oxidize an allylic alcohol to an α,β- unsaturated ketone or aldehyde. Examples of those are 2,3-dichloro-5,6-dicyano-1,4 - benzoquinone, activated manganese dioxide, or nickel peroxide (see Fieser et al., "Reagents for Organic Syntheses," John Wiley & Sons, Inc., New York, N.Y., 1967, pp. 215, 637, and 731). Alternatively, these oxidations are carried out by oxygenation in the presence of the 15-hydroxyprostaglandin dehydrogenase of swine lung (see Arkiv for Kemi 25, 293 (1966). These reagents are used according to procedures known in the art. See, for example, J. Biol. Chem. 239, 4097 (1964).

Regarding the transformation of XVII to XVIII in Chart C, these silylations are carried out as described above for the Chart A and Chart B silylation.

The carbonyl reduction of XIII to XIV is carried out as described above for the transformation of PGE-type Formula IX compounds to PGF-type Formula X compounds. As for those reductions, the sodium, potassium and zinc borohydrides are preferred as reducing agents, especially zinc borohydride.

When the method used to isolate the carbonyl reduction product does not remove any —Si—(A)$_3$ groups which may be present, that is accomplished as described above for the removal of —Si—(A)$_3$ groups from Formula VII products (Chart A, VII to VIII).

The Formula XIV and XV products are separated from each other by methods known in the art, for example, silica gel chromatography. See, for example, Pike et al., J. Org. Chem. 34, 3552 (1969) for this type of separation.

If one of the isomers or isomer mixtures of Formulas XIV or XV is not desired for a pharmacological use as such or transformed to esters or pharmacologically acceptable salts as described above, that isomer or isomer mixture is recycled as a Formula XI starting material in the processes of Chart C to produce additional of the desired isomer.

In Chart D is shown an optional route to PGF$_{2\alpha}$, starting with 15$\beta$-PGA$_2$ acetate methyl ester, the most abundant component of *Plexaura homomalla* (Esper), 1792, forma R. In Chart E is shown a route to PGE$_2$, starting with PGA$_2$, readily obtained as described above from *Plexaura homomalla* (Esper), 1792, forma S.

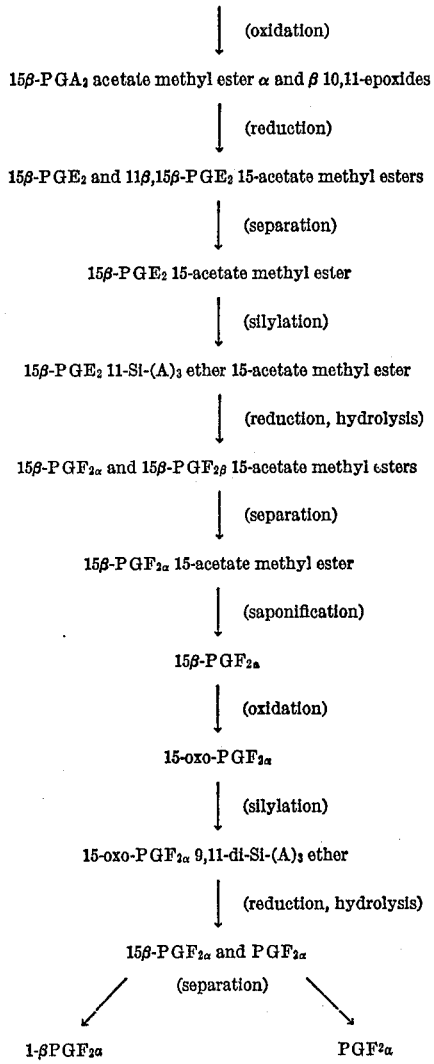

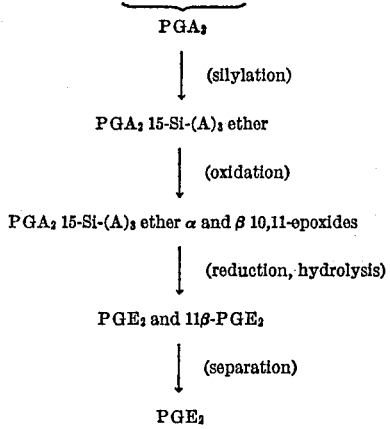

All of these Chart D and Chart E reactions and reagents for effecting them are described generically and specifically above, and all are exemplified below in the preparations.

The invention is more fully understood by the following preparations and examples:

All temperatures are in degrees centigrade.

Ultraviolet spectra are recorded on a Cary Model 15 spectrophotometer.

The collection of chromatographic eluate fractions starts when the eluant front reaches the bottom of the column.

"Brine," herein, refers to an aqueous saturated sodium chloride solution.

The A–IX solvent system used in thin layer chromatography (TLC) is made up from ethyl acetate-acetic acid-2,2,4-trimethylpentane-water (90:20:50:100) according to M. Hamberg and B. Samuelsson, J. Biol. Chem. 241, 257 (1966).

Preparation 1

To distinguish *Plexaura homomalla* (Esper), 1792, forma R from *Plexaura homomalla* (Esper), 1792, forma S, a TLC method is used. A specimen approximately 2 cm. in length is harvested and placed in a small vial, with a small amount of water if necessary to insure it is wet, and kept closed for 6–24 hrs. About one ml. of methanol is then added and the sample is either shaken for 2 hrs. at about 25° C. or is stored for 16–24 hrs. at about 10° C. A sample of the liquid (10–21 λ) is spotted on a TLC plate. It is preferred to use a fluorescent-treated silica gel plate, e.g., Uniplate Silica Gel GF (Analtech, Inc., Newark, Del.). As reference standards, spots of PGA$_2$ and 15$\beta$–PGA$_2$ are also applied. The plate is developed in the A–IX system. The spots are finally visualized with vanillin-phosphoric acid spray (McAleer, Arch. Biochem. E. Biophys. 66, 120 (1957)). Comparison of the unknown with the two reference spots is then made and the identity of the coral established (forma S corresponding ot PGA$_2$, forma R to 15$\beta$-PGA$_2$).

Preparation 2.—PGA$_2$ and 5,6-trans-PGA$_2$

Separation of PGA$_2$ from 5,6-trans-PGA$_2$ is done on a chromatographic column using a silver-saturated ion-exchange resin. Preferably a macroreticular ion exchange resin is used, e.g. a sulfonated styrene-divinylbenzene copolymer having surface area of 40–50 sq. m./g., 30–40% porosity, and total exchange capacity of 4.5–5.0 meq. per gram of dry resin, for example Amberlyst 15, available from Rohm and Haas Co., Philadelphia, Pa. The acid-form resin is packed in a column, washed with warm water, and converted to the silver form by passing a 10% silver nitrate solution through the column until the effluent shows a pH of 3.5–4.0. The column is then washed with water to remove ionic silver, and finally with denatured ethanol (Type 3A). A solution of a mixture of PGA$_2$ and 5,6-trans-PGA$_2$, e.g. fractions 15–18 of Example 7 below, in ethanol is charged to the column. Elution with 3A alcohol then yields fractions which are combined according to their content of 5,6-trans-PGA$_2$ (less polar) or PGA$_2$. Testing for the presence of 5,6-trans-PGA$_2$ or PGA$_2$ in the eluate is conveniently done by TLC using silver nitrate-treated silica gel plates (e.g. Analtech Uniplates dipped in saturated ethanolic silver nitrate and dried) and developing with the A–IX system. R$_f$ of PGA$_2$ is 0.45; R$_f$ of 5,6-trans-PGA$_2$ is 0.50. Combined fractions are concentrated, partitioned between dichloromethane and a little water, dried over sodium sulfate, and concentrated under reduced pressure to yield the title compounds.

For quantitatively assaying the 5,6-trans-PGA$_2$ content of mixtures of PGA$_2$ and 5,6-trans-PGA$_2$ a combination thin-layer-spectrophotometric assay is used. Silica gel-impregnated glass microfiber sheet (e.g. ITLC sheets of the Gelman Instrument Co., Ann Arbor, Michigan) are impregnated with silver nitrate, using 5% ethanolic silver nitrate and drying. Spots of 100 to 200 μg. of the PGA$_2$ mixture are applied and developed in the solvent system 2,2,4-trimethylpentane:ethyl acetate:acetic acid:water (100:35:8:10, upper phase). The sheet is dried and sprayed with Rhodamine 6G (Applied Science Co., State College, Pa.) and viewed under ultraviolet light. The areas containing the cis and trans materials (R$_f$ of PGA$_2$=0.6; R$_f$ of 5,6-trans-PGA$_2$=0.7) are marked, then excised and eluted with methanol (1.9 ml.) and potassium hydroxide solution (0.1 ml. of 45%). After incubation at 40° for 30 min., the respective solutions are centrifuged and analyzed spectrophotometrically at 278 nm.

Following the procedure of Preparation 2, 5,6-trans-15β-PGA$_2$ is separated from 15β-PGA$_2$.

Preparation 3.—PGA$_2$15-acetate methyl ester, separation from 5,6-trans-PGA$_2$ 15-acetate methyl ester A mixture of PGA$_2$ 15-acetate methyl ester and 5,6-trans-PGA$_2$ 15-acetate methyl ester (11.0 g., 85:15) is dissolved in 415 ml. of a solution of methanol-water-acetic acid (95–5–0.4) and mercuric acetate (6.1 g.), and left standing at about 25° C. for 30 min. Water (250 ml.) is added and the mixture extracted twice with 700 ml. of Skellysolve B. The Skellysolve B phase is washed with 100 ml. of 60% methanol, dried over sodium sulfate, and concentrated to an oil (4.35 g.) having a high content of 5,6-trans-PGA$_2$ 15-acetate methyl ester. The aqueous methanol phase is acidified with 32 ml. of 6 N. hydrochloric acid and the mixture is extracted with two portions of 700 ml. of Skellysolve B. The organic phase is dried over sodium sulfate and concentrated to an oil (5.53 g.). This last material is subjected to the same procedures again, using 350 ml. of the methanol-water-acetic acid and 4.6 g. of mercuric acetate. There is recovered from the work-up of the aqueous methanol phase a fraction (3.92 g.) of the title compound containing only a small percentage of the 5,6-trans-PGA compound.

Following the procedure of preparation 3, 5,6-trans-15β-PGA$_2$ 15-acetate methyl ester is separated from 15β-PGA$_2$ 15-acetate methyl ester.

Preparation 4.—15β-PGA$_2$ methyl ester

A solution of 70% aqueous perchloric acid (50 drops) in 50 drops of water is added to a solution of 15β-PGA$_2$ acetate methyl ester (Example 3 below, 2.0 g.) in 100 ml. of methanol. The mixture is stirred for 15 hrs. at 25° C. and then diluted with 80 ml. of water. The methanol is removed under reduced pressure, and the aqueous residue is extracted with ethyl acetate. The extract is washed successively with water and brine, dried with anhydrous sodium sulfate, and evaporated. The residue is chromatographed on 200 g. of silica gel, eluting with 2.5 l. of a gradient of 20–70% ethyl acetate in Skellysolve B (a mixture of isomeric hexanes), collecting 100-ml. fractions. Fractions 15–19 are combined and evaporated to give 727 mg. of 15β-PGA$_2$ methyl ester.

Preparation 5.—PGA$_2$ methyl ester

A solution of 15β-PGA$_2$ methyl ester (Preparation 4, 250 mg.) in 20 ml. of anhydrous tetrahydrofuran is cooled to 0° C. in an atmosphere of nitrogen. Tributylamine (1.5 ml.) is added, and the mixture is stirred at 0° C. while adding methanesulfonyl chloride (1 ml.) dropwise. The mixture is stirred 30 minutes at 0° C. Then, 10 ml. of water is added, and the mixture is allowed to warm to 25° C. and is stirred for one hour. The tetrahydrofuran is evaporated under reduced pressure, and the aqueous residue is extracted with ethyl acetate. The extract is washed successively with one N hydrochloric acid, water, and brine, dried with anhydrous sodium sulfate, and evaporated. The residue is chromatographed on 30 g. of silica gel, eluting with 800 ml. of a gradient of 20–70% ethyl acetate in Skellysolve B, collecting 25 ml. fractions. Fractions 14–16 are combined and evaporated to give 58 mg. of PGA$_2$ methyl ester. Fractions 12 and 13 are combined to give 49 mg. of the starting material, 15β-PGA$_2$ methyl ester.

Following the procedure of Preparation 5, PGA$_2$ methyl ester is transformed to a mixture of PGA$_2$ and 15β-PGA$_2$ methyl esters, the two compounds being separated as in Preparation 5.

Preparation 6.—15β-PGA$_2$ 10,11-epoxide acetate methyl ester

Hydrogen peroxide (350 ml.; 30% aqueous) is added with stirring to a solution of 15β-PGA$_2$ acetate methyl ester (Example 3 below, 265 g.) in 5000 ml. of methanol under a nitrogen atmosphere at −20° C. Then, one N aqueous potassium hydroxide solution (50 ml.) is added gradually during one hour wth stirring at −20° C. The mixture is stirred an additional 2 hours at −20° C. Then, one N hydrochloric acid (80 ml.) is added, and the methanol is removed under reduced pressure at 35° C. The residue is dissolved in 3000 ml. of ethyl acetate, and the solution is washed 3 times with 500-ml. portions of water. The combined water washes are extracted with 300 ml. of ethyl acetate. The two ethyl acetate solutions are combined, washed with brine, dried with anhydrous sodium sulfate and evaporated to give 2.75 g. of a mixture of the alpha and beta 10,11-epoxides of 15β-PGA$_2$ acetate methyl ester.

Preparation 7.—15β-PGE$_2$ 15-acetate methyl ester and 11β,15β-PGE$_2$ 15-acetate methyl ester Granular aluminum metal (50 g.) is added to a solution of mercuric chloride (50 g.) in 2 l. of water. The mixture is swirled until hydrogen gas evolution starts to become vigorous (about 30 seconds). Then, most of the aqueous solution is decanted, and the rest is removed by rapid filtration. The amalgamated aluminum is washed rapidly and successively with two 200-ml. portions of methanol and two 200-ml. portions of anhydrous diethyl ether. The amalgamated aluminum is then covered with anhydrous diethyl ether until used.

Methanol (250 ml.) and water (25 ml.) are added to a solution of a mixture of the alpha and beta 10,11-epoxides of 15β-PGA$_2$ acetate methyl ester (Preparation 6, 275 g.) in 2500 ml. of diethyl ether. The mixture is cooled to −10° C. and the amalgamated aluminum prepared as above from 50 g. of aluminum metal is added. The mixture is stirred and maintained at about 25° C. with external cooling. After one hour, amalgamated aluminum prepared as above from 50 g. of aluminum metal is added. After an additional hour of stirring at 25° C., amalgamated aluminum prepared as above from 50 g. of aluminum metal and also 25 ml. of water are added. After an additional hour of stirring at 25° C., 100 g. of magnesium sulfate is added as a filter aid, and the mixture is filtered. The filter cake is washed thoroughly with dichloromethane, and the combined filtrate and washings are evaporated at 25° C. under reduced pressure to give a mixture (247 g.) of 15β-PGE$_2$ 15-acetate methyl ester and 11β,15β-PGE$_2$ 15-acetate methyl ester.

Part of this mixture (210 g.) is chromatographed on 30 kg. of silica gel wet-packed with 60 l. of 25% ethyl acetate in Skellysolve B (6-inch diameter column), eluting successively with 60 l. portions of 25%, 30%, 35%, 40%, 45%, 50%, 55%, and 60% ethyl acetate in Skellysolve B, collecting 4 l. fractions. Fractions 71–76 are combined and evaporated to give 27 g. of 11β,15β-PGE$_2$ 15-acetate methyl ester. Fractions 81–98 are combined and evaporated to give 115 g. of 15β-PGE$_2$ 15-acetate methyl ester.

Preparation 8.—15β-PGE$_2$ 11—Si—(CH$_3$)$_3$ ether 15-acetate methyl ester

Hexamethyldisilazane (100 g.) and then trimethylchlorosilane (20 g.) are added to a solution of 15β-PGE$_2$ 15-acetate methyl ester (Preparation 7) in 400 ml. of tetrahydrofuran with vigorous stirring at 25° C. under nitrogen. The reaction mixture is maintained in the range 20° to 25° C. by external cooling, and is stirred 2 hours under nitrogen. Then, the mixture is evaporated at 50° C. at reduced pressure. The residue is mixed with 150 ml. of toluene, and the mixture is filtered through a pad of diatomaceous earth. The filtrate is evaporated at 50° C. under reduced pressure. The residue is mixed with 150 ml. of toluene, and again the toluene is removed under reduced pressure at 50° C. to give 75 g. of 15β-PGE$_2$ 11—Si—(CH$_3$)$_3$ ether 15-acetate methyl ester.

Following the procedure of Preparation 8, 11β,15β-PGE$_2$ 15-acetate methyl ester is transformed to the corresponding 11—Si—(CH$_3$)$_3$ ether.

Also following the procedure of Preparation 8, but using larger amounts of hexamethyldisilazane and trimethylchlorosilane, 15β-PGE$_2$ methyl ester, 15β-PGE$_2$, 11β,15β-PGE$_2$ methyl ester, and 11β,15β-PGE$_2$ are transformed to the corresponding 11,15-di-Si-(CH$_3$)$_3$ ethers.

Preparation 9.—15βPGF$_{2\alpha}$ 15-acetate methyl ester and 15β-PGF$_{2\beta}$ 15-acetate methyl ester Sodium borohydride (1.42 g.) is added in one portion to a solution of 15β-PGE$_2$ 11-Si-(CH$_3$)$_3$ ether 15-acetate methyl ester (Preparation 8, 30.7 g.) in 500 ml. of absolute ethanol at 0° C. with stirring. The mixture is stirred at 0° C. for 3.5 hours. Then, 10 ml. of glacial acetic acid is added slowly with stirring at 0° C. Then, 100 ml. of water is added, and the mixture is allowed to warm to 25° C. with stirring, and is stirred 15 hours at 25° C. The ethanol is evaporated under reduced pressure, and the residue is mixed with 400 ml. of brine. The mixture is extracted with 3 portions of ethyl acetate (400 ml., 250 ml., and 150 ml.). The combined extracts are washed successively with two 100-ml. portions of water, 100 ml. of saturated aqueous sodium bicarbonate solution, two 100-ml. portions of brine, dried with anhydrous sodium sulfate, and evaporated under reduced pressure to give 24.5 g. of a mixture of 15β-PGF$_{2\alpha}$ 15-acetate methyl ester and 15β-PGF$_{2\beta}$ 15-acetate methyl ester.

Preparation 10.—15β-PGF$_{2\alpha}$ and 15β-PGF$_{2\beta}$

Aqueous sodium hydroxide solution (10%; 275 ml.) is added to a solution of 48 g. of a mixture of 15β-PGF$_{2\alpha}$ 15-acetate methyl ester and 15β-PGF$_{2\beta}$ 15-acetate methyl ester (Preparation 9) in 350 ml. of methanol at 0° C. with stirring under nitrogen. The mixture is allowed to warm to 25° C. with stirring, and is stirred 3 hours at 25° C. Then, the methanol is evaporated under reduced pressure at 35° C. The aqueous residue is cooled and extracted once with a mixture of diethyl ether and dichloromethane (1:1). Then, the aqueous residue is acidified with 260 ml. of 3 N hydrochloric acid, saturated with sodium chloride, and extracted with 3 portions of ethyl acetate (400 ml., 250 ml., and 150 ml.). The combined extracts are washed successively with two 100-ml. portions of water and two 100-ml. portions of brine, dried with anhydrous sodium sulfate, and evaporated to give 42 g. of a mixture of 15β-PGF$_{2\alpha}$ and 15β-PGF$_{2\beta}$.

Preparation 11.—15-oxo-PGF$_{2\alpha}$ and 15-oxo-PGF$_{2\beta}$

The mixture of 15β-PGF$_{2\alpha}$ and 15β-PGF$_{2\beta}$ (42 g.) obtained as in Preparation 10 is dissolved in 950 ml. of dioxane. To this solution at 25° C. is added 2,3-dichloro-5,6-dicyano-1,4-benzoquinone (40 g.). This mixture is stirred 18 hours at 50° C. under nitrogen. The mixture is then cooled teo 25° C. and filtered. The filter cake is washed with dichloromethane, and the combined filtrate and washing are evaporated under reduced pressure at 45° C. to give a mixture (66 g.) of 15-oxo-PGF$_{2\alpha}$ and 15-oxo-PGF$_{2\beta}$.

Part of this mixture (33 g.) is chromatographed on 3 kg. of acid-washed silica gel, eluting successively with 10 l. 60%, 10 l. 70%, 10 l. 80%, 20 l. 90% ethyl acetate in Skellysolve B, 15 l. ethyl acetate, and 10 l. 5% methanol in ethyl acetate, collecting 650 ml. fractions. Fractions 42–53 are combined and evaporated to give 8.3 g. of 15-oxo-PGF$_{2\alpha}$. Fractions 64–85 are combined and evaporated to give 3.3 g. of 15-oxo-PGF$_{2\beta}$.

Preparation 12.—PGF$_{2\alpha}$ and 15β-PGF$_{2\alpha}$

Hexamethyldisilazane (70 ml.) and trimethylchlorosilane (14 ml.) are added with vigorous stirring to a solution of 15-oxo-PGF$_{2\alpha}$ (Preparation 11, 3.0 g.) in 350 ml. of tetrahydrofuran at 25° C. under nitrogen. The mixture is stirred 18 hours at 25° C. under nitrogen. Then, the mixture is evaporated under reduced pressure at 50° C. Toluene (100 ml.) is added to the residue, and the mixture is filtered through a pad of diatomaceous earth. The filtrate is evaporated, and 100 ml. of toluene is added to the residue. This mixture is evaporated under reduced pressure to give the 9,11-di-Si-(CH$_3$)$_3$ ether of 15-oxo-PGF$_{2\alpha}$.

This disilyl ether is dissolved in 20 ml. of 1,2-dimethoxyethane. Sodium borohydride (680 mg.) is suspended in 65 ml. of 1,2-dimethoxyethane at 0° C. under nitrogen. Anhydrous zinc chloride (1.23 g.) is added to this suspension, and the mixture is stirred 30 minutes at 0° C. Then, the solution of the disilyl ether is added dropwise during 10 minutes with stirring at 0° C. The resulting mixture is allowed to warm to 25° C. with stirring, and is stirred 4 hours at 25° C. Then, 30 ml. of water is added, followed by 8 ml. of glacial acetic acid. This mixture is stirred 15 hours at 25° C. The mixture is then poured into a mixture of ice and 100 ml. of 0.5 N hydrochloric acid. That mixture is saturated with sodium chloride, and then extracted with several portions of ethyl acetate. The combined extracts are washed with brine, dried with anhydrous sodium sulfate, and evaporated under reduced pressure. The residue (3.2 g.) is chromatographed on 600 g. of acid-washed silica gel, eluting successively with 5 l. of 75% ethyl acetate in Skellysolve B, 5 l. of 90% ethyl acetate in Skellysolve B, and 5 l. of a gradient of 90% ethyl acetate and 10% methanol in ethyl acetate, collecting 550 ml. fractions. Fractions 21–26 are combined and evaporated to give 543 mg. of 15β-PGF$_{2\alpha}$. Fractions 28–36 are combined and evaporated to give 1.62 g. of PGF$_{2\alpha}$.

Preparation 13.—15-oxo-PGF$_{2\beta}$

Following the procedure of Preparation 11, 15β-PGF$_{2\beta}$ is oxidized to 15-oxo-PGF$_{2\beta}$.

Preparation 14.—PGF$_{2\beta}$ and 15β-PGF$_{2\beta}$

Following the procedure of Preparation 12, 15-oxo-PGF$_{2\beta}$ is silylated and then reduced to a mixture of PGF$_{2\beta}$ and 15β-PGF$_{2\beta}$ which are separated as described for the alpha compounds in Preparation 12.

Preparation 15.—PGE$_2$ and 11β-PGE$_2$

Hexamethyldisilizane (1 ml.) and trimethylchlorosilane (0.2 ml.) are added with stirring to a solution of PGA$_2$ (250 mg.) in 4 ml. of tetrahydrofuran at 0° C.

under nitrogen. This mixture is maintained at 5° C. for 15 hours. The mixture is then evaporated under reduced pressure. Toluene is added and evaporated twice. Then the residue is dissolved in 6 ml. of methanol, and the solution is cooled to −20° C. Hydrogen peroxide (0.45 ml.; 30% aqueous) is added. Then, one N sodium hydroxide solution (0.9 ml.) is added dropwise with stirring at −20° C. After 2 hours at −20° C., an additional 0.3 ml. of the sodium hydroxide solution is added with stirring at −20° C. After another hour in the range −10° to −20° C., an additional 0.1 ml. of the sodium hydroxide solution is added. Then, 1.5 ml. of one N hydrochloric acid is added, and the mixture is evaporated under reduce pressure. The resiue is extracted with ethyl acetate, and the extract is washed successively with one N hydrochloric acid and brine, dried with anhydrous sodium sulfate and evaporated. The residue is dissolved in 5 ml. of diethyl ether. To this solution is added 0.5 ml. of methanol and 0.1 ml. of water. Then, amalgamated aluminum made from 0.5 g. of aluminum metal as described in Preparation 7 is added in small portions during 3 hrs. at 25° C. Then, ethyl acetate and 3 N hydrochloric acid are added, and the ethyl acetate layer is separated and washed successively with one N hydrochloric acid and brine, dried with anhydrous sodium sulfate, and evaporated. The residue is chromatographed on 50 g. of acid-washed silica gel, eluting first with 400 ml. of a gradient of 50–100% ethyl acetate in Skellysolve B, and then with 100 ml. of 5% methanol in ethyl acetate, collecting 25 ml. fractions. Fractions 9 and 10 are combined and evaporated to give 18 mg. of $11\beta$-$PGE_2$. Fractions 17–25 are combined and evaporated to give 39 mg. of $PGE_2$.

Preparation 16.—$PGE_2$ (Refer to Chart C)

(a) Silylation.—A mixture of $PGA_2$ (0.68 g.), 4 ml. of tetrahydrofuran (THF), and 1 ml. of trimethylchlorosilane solution (5% in hexamethyldisilazane) is stirred under nitrogen for 2 hrs. at about 25° C. Then the silylated material is concentrated by removal of THF under reduced pressure, utilizing added benzene (10 ml.) to facilitate removal of THF.

(b) Oxidation.—A cold (−40° C.) solution of the above silylated material in 15 ml. of isopropyl alcohol is mixed with 1.2 ml. of 30% aqueous hydrogen peroxide, followed by 1.5 ml. of 3 N. aqueous lithium hydroxide added dropwise. The temperature is allowed to warm to about −30° C. The reaction is continued until the $PGA_2$ has been exhausted as shown by the absence of $PGA_2$ in a thin layer chromatographic (TLC) spot test using the A–IX system (Hamberg and Samuelsson, J. Biol. Chem. 241, 257 (1966). At −30° C., the reaction time is about 3–4 hrs. After completion, 5 ml. of 1 N. hydrochloric acid is added and the mixture is concentrated under reduced pressure. The residue is extracted with ethyl acetate, washed with 0.5 N. hydrochloric acid and then brine, dried over sodium sulfate, and concentrated to the epoxide.

(c) Reduction and hydrolysis.—A solution of the above epoxide in 20 ml. of THF and 2 ml. of methanol is stirred with 4 ml. of saturated aqueous sodium bicarbonate solution and cooled to 15° C. To the mixture is added, in portions with vigorous stirring, an aluminum amalgam made from 1 g. of powdered aluminum (Preparation 7). After stirring at about 25° C. for 45 min., a sample is analyzed by TLC for $PGE_2$ and epoxide. Reaction is continued if necessary. When the epoxide is no longer present, the supernatant suspension is decanted from the aluminum which is further washed with ethyl acetate. The combined decantate and washes are concentrated under reduced pressure. The residue is taken up in about 15–20 ml. of ethyl acetate and shaken with 20 ml. of 1 N. hydrochloric acid. The layers are separated, the organic phase is washed with 0.5 N. hydrochloric acid, and then brine, dried and concentrated to an oily residue of 0.837 g.

(d) Separation.—A solution of the above residue in a small amount of 20% ethyl acetate-Skellysolve B (isomeric hexanes) is applied to a chromatographic column of 65 g. of acid-washed silica, e.g. Mallinckrodt Silicar CC-4. Elution with a gradient of 20–100% ethyl acetate-Skellysolve B gives fractions. Those fractions which are shown by TLC to contain the desired compound are combined, and concentrated. There is obtained in separate fractions $PGE_2$, 0.5 g., and $11\beta$-$PGE_2$, 0.05 g.

Alternatively, the oily product from c above is triturated in ethyl acetate-cyclohexane (1:1), cooled to about 10° C. and seeded to yield crystalline $PGE_2$, about 0.4 g. The mother liquor is subjected to silica gel chromatography to yield separate fractions of about 0.1 g. $PGE_2$ and 0.05 g. $11\beta$-$PGE_2$.

EXAMPLE 1

$PGA_2$, $PGA_2$ methyl ester, and $PGA_2$ acetate methyl ester from Plexaura homomalla (Esper), 1792, forma S Colonies of Plexaura homomalla (Esper), 1972, forma S, collected from reefs off the north shore of Jamaica, are chopped into pieces several cm. in length frozen. The pieces (500 g.) are then covered with methanol and the mixture is maintained for 3 hours at 25° C. The mixture is then ground in a Waring blender and filtered, and the filtrate is evaporated under reduced pressure. The residue is dissolved in ethyl acetate, and the solution is washed successively with one N hydrochloric acid, water, and saturated aqueous sodium chloride solution, dried with anhydrous sodium sulfate, and evaporated under reduced pressure. The oily residue is chromatographed on 2 kg. of acid-washed silica gel wet-packed with Skellysolve B (a mixture of isomeric hexanes), eluting with 24 l. of a 25 to 100% ethyl acetate in Skellysolve B gradient. The fractions which contain $PGA_2$ acetate methyl ester, $PGA_2$ methyl ester, and $PGA_2$ as shown by TLC with the A–IX system are separately combined and evaporated to give those three compounds, respectively, in the ratio 60:20:20.

EXAMPLE 2

$15\beta$-$PGA_2$ compounds from Plexaura homomalla (Esper), 1792, forma R

Following the procedures of Example 1, but replacing Plexaura homomalla (Esper), 1792, forma S with Plexaura homomalla (Esper), 1792, forma R collected from reefs off the southeast shore of Florida near Miami, there are obtained $15\beta$-$PGA_2$ acetate methyl ester, $15\beta$-$PGA_2$ acetate, $15\beta$-$PGA_2$ methyl ester, and $15\beta$-$PGA_2$.

Likewise following the procedures of Examples 1 and 2 but replacing methanol with acetone, there are obtained the respective $PGA_2$ and $15\beta$-$PGA_2$ compounds.

EXAMPLE 3

$15\beta$-$PGA_2$ compounds from Plexaura homomalla (Esper), 1792, forma R

Colonies of Plexaura homomalla (Esper), 1792, forma R, collected from reefs off the southeast shore of Florida near Miami, are chopped into chunks several inches long. The chunks are frozen by contact with solid carbon dioxide within one hour after removal from the reef waters. The frozen colony pieces are maintained in insulated boxes containing solid carbon dioxide (temperature below about −20° C.) until the time for extraction. Then, the frozen colony pieces are ground to a small particle size (Mitts and Merrill hogger; average largest dimension about 5 mm.). The particles (1500 g.) are then stirred at high speed with 5 gallons of dichloromethane for 20 minutes at about 25° C. external temperature. The mixture of dichloromethane and particles is then filtered through a pad of diatomaceous earth, and the filtrate is evaporated to about a 2-liter colume at 30° C. under reduced pressure. The liquid which remains is washed with water, dried with sodium sulfate, and evaporated at 30° C. under reduced pressure.

The oily residue (60 g.) is chromatographed on 3 kg. of silica gel wet packed in Skellysolve B (a mixture of isomeric hexanes), eluting successively with a gradient of 4 l. of Skellysolve B and 4 l. of 20% ethyl acetate in Skellysolve B, 27 l. of 20%, 18 l. of 50%, and 8 l. of 75% ethyl acetate in Skellysolve B, collecting 600 ml. fractions. Fractions 39–60 are combined and evaporated to give 24.3 g. of 15β-PGA$_2$ acetate methyl ester. Between fractions 60 and 74 those fractions shown by TLC to contain 15β-PGA$_2$ acetate are combined and evaporated to yield that compound. Fractions 74–76 are combined and evaporated to give 1.03 g. of 15β-PGA$_2$ methyl ester. Fractions 83–91 are combined and evaporated to give 1.08 g. of 15β-PGE$_2$ 15-acetate methyl ester. Still later fractions shown by TLC to contain 15β-PGE$_2$ methyl ester are combined and evaporated to yield that compound.

Detection of the respective compounds by TLC is done by methods known in the art, e.g. by spotting the extract fractions on a TLC silica gel plate alongside spots of the authentic compounds, developing the plate with the A–IX system, and observing which spots of the extract fractions correspond exactly to the spots of the authentic compounds.

Following the procedures of Example 3, but substituting *Plexaura homomalla* (Esper), 1792, forma S for the *Plexaura homomalla* (Esper), 1792, forma R of that example, there are obtained the corresponding compounds of 15(S) configuration, viz.: PGA$_2$ acetate methyl ester, PGA$_2$ acetate, PGA$_2$ methyl ester, PGE$_2$ 15-acetate methyl ester, and PGE$_2$ methyl ester.

EXAMPLE 4

Following the procedures of Example 3, but replacing *Plexaura homomalla* (Esper), 1792, forma R, with *Plexaura homomalla* (Esper), 1792, forma S collected from reefs off the north shore of Jamaica, and substituting benzene for dichloromethane, there are obtained PGA$_2$ acetate methyl ester, PGA$_2$ acetate, PGA$_2$ methyl ester, PGE$_2$ 15-acetate methyl ester, and PGE$_2$ methyl ester.

EXAMPLE 5

PGA$_2$ from *Plexaura homomalla* (Esper), 1792, forma S

Colonies of *Plexaura homomalla* (Esper), 1792, forma S, collected from reefs off the north shore of Jamaica, are chopped into pieces weighing less than about 2 grams. The chopped material, wet with water, is stored in closed containers for about 24 hrs. at 25° C. or until PGA$_2$ 14-acetate compounds are no longer present, as shown by TLC analysis. The TLC sample is taken from the liquid phase of a mixture of a small representative sample of the coral, with adhering liquid, stirred or shaken in at least an equal volume of acetone.

About one kg. of the water-wet chopped *Plexaura homomalla* is then stirred in one l. of acetone for about one hr. and filtered. The solids are extracted in this manner four more times with acetone and finally once with dichloromethane. The aqueous acetone leach liquors are concentrated under vacuum to about one-tenth their original volume. To control foaming, an antifoam agent is added, e.g. a polypropylene glycol such as Ucon LB–625 (Union Carbide), at a level of about one gram per kg. of wet colony pieces. The concentrate is then extracted three times with dichloromethane and the combined dichloromethane extracts are concentrated to about one-fifth their original volume.

The dichloromethane concentrate is extracted seven times with an aqueous solution of 0.5 M disodium orthophosphate, using 1.5 times the volume of the organic phase. To control emulsions, a 1% solution of antifoam agent, e.g. Ucon LB–625, in methanol is added, up to one-tenth the volume of the aqueous phase. The combined aqueous extracts are then acidified to pH 2–3 with 4 N hydrochloric acid and extracted with dichloromethane. The dichloromethane extracts are decolorized with activated carbon, dried over anhydrous sodium sulfate, and concentrated under vacuum.

The residue is chromatographed on 2 kg. of acid-washed silica gel wet-packed with Skellysolve B, eluting with 25–100% ethyl acetate in Skellysolve B gradient. The fractions which contain PGA$_2$ methyl ester and PGA$_2$ as shown by TLC with the A–IX system are separately combined and evaporated to give those compounds, PGA$_2$ being the principal product.

Following the procedures of Example 5, but subjecting the water-wet chopped *Plexaura homomalla* form S to a freezing step with solid carbon dioxide after storage at 25° C. for 24 hrs., the frozen solids are stored below about −20° C. for a week. Then, they are thawed, stirred into acetone, and thereafter processed to the same products as above.

EXAMPLE 6

15β-PGA$_2$ from *Plexaura homomalla* (Esper), 1792, forma R

Following the procedures of Example 5 but replacing the *Plexaura homomalla* (Esper), 1792, forma S of that example with chopped colony pieces of *Plexaura homomalla* (Esper), 1792, forma R, there are obtained 15β-PGA$_2$ methyl ester and 15β-PGA$_2$ methyl ester and 15β-PGA$_2$. 15β-PGA$_2$ is the principal product.

EXAMPLE 7

PGA$_2$ from *Plexaura homomalla* (Esper), 1792, forma S.

Colonies of *Plexaura homomalla* (Esper), 1792, forma S, collected from reefs off the north shore of Jamaica, are frozen by contact with solid carbon dioxide within one hour after removal from the reef waters. The frozen colonies are maintained in insulated boxes containing solid carbon dioxide (temperature below about −20° C.) until ready for thawing. Then, the frozen colonies (700 g.) are ground to a small particle size (Waring blender) and mixed with 1500 ml. of water. The mixture is maintained about 20 hours. at about 25° C. with stirring. Then, the the mixture is filtered through a pad of diatomaceous earth, and the filtrate is acidified with concentrated hydrochloric acid to pH about 2–3. The acidified filtrate is extracted four times with ethyl acetate. The extracts are combined, filtered, washed with brine, dried with anhydrous sodium sulfate, and evaporated under reduced pressure to give 11 g. of oily residue.

The solid residue on the diatomaceous earth filter pad is stirred 2 hours in methanol (enough to cover said residue) at 25° C. The mixture is then filtered, and the filtrate is evaporated to give 14 g. of oily residue.

The oily residues are combined and chromatographed on 1500 g. of acid-washed silica gel, eluting successfully with 8 l. of a 25 to 65% gradient of ethyl acetate in Skellysolve B, 8 l. of a 65 to 100% gradient of ethyl acetate in Skellysolve B, and 5 l. of 2% methanol in ethyl acetate, collecting 500 ml. fractions. (Skellysolve B is a mixture of isomeric hexanes). Fractions 8–12 are combined and evaporated to give a small amount of PGA$_2$ containing a trace of PGA$_2$ methyl ester. Fractions 15–18 are combined and evaporated to give 9.54 g. of PGA$_2$. Fractions 35–40 are combined to give 0.414 g. of PGE$_2$.

EXAMPLE 8

15β-PGA$_2$ from *Plexaura Homomalla* (Esper), 1792, forma R.

Colonies of *Plexaura homomalla* (Esper), 1792, forma R, collected from reefs off the southeast shore of Florida near Miami, are chopped into chunks several inches long. The chunks are frozen by contact with solid carbon dioxide within one hour after removal from the reef waters. The frozen colony pieces are maintained in insulated boxes containing solid carbon dioxide (temperature below about −20° C.) until ready for thawing. Then, colony pieces (600 g.) are mixed with 1500 ml. of water. The mixture is stirred and maintained at 25° C. for 23 hours. The mixture is then filtered through a pad of diatomaceous earth, and the filtrate is acidified to pH about 2–3 with concentrated hydrochloric acid. The acidified filtrate is extracted four times with ethyl acetate. The extracts are combined, filtered, washed with brine, dried with anhydrous sodium sulfate, and evaporated to give 9.2 g. of oily residue.

The solid residue on the diatomaceous earth pad is stirred 15 hours in methanol (enough to cover said residue) at 25° C. The mixture is then filtered, and filtrate is evaporated. The residue is dissolved in ethyl acetate, and the solution washed successively with 3 N hydrochloric acid and brine, dried with anhydrous sodium sulfate, and evaporated to give 5.83 g. of an oily residue.

The second oily residue and 8.2 g. of the first oily residue are combined and chromatographed on one kg. of acid-washed silica gel, eluting successively with 3–1. Portions of 25%, 35%, 45%, 55%, and 65% ethyl acetate in Skellysolve B, collecting 500-ml. fractions. Fractions 18–22 are combined and evaporated to give 5.54 g. of $15\beta$-$PGA_2$. Fractions 15–17 are combined and evaporated to give 1.37 g. of $15\beta$-$PGA_2$ methyl ester.

We claim:

1. In a process for extracting prostanoic acid derivatives from colonies or colony pieces of the marine invertebrate *Plexaura homomalla* (Esper), 1792, forma S or the marine invertebrate *Plexaura homomalla* (Esper), 1792, forma R, the improvement wherein said colonies or colony pieces, prior to extraction, are maintained in contract with water in a temperature range up to 50° C. until substantially all of the C–15 acetates of the prostanoic acid derivatives originally present in the colonies or colony pieces are transformed to C–15 hydroxy prostanoic acid derivatives.

2. A process improvement according to claim 1 wherein the colonies or colony pieces are cooled to a temperature at least as low as +5° C. prior to maintaining in contact with water.

3. A process improvement according to claim 1 wherein the colonies or colony pieces are frozen and thawed prior to maintaining in contact with water.

4. A process improvement according to claim 1 wherein after the colonies or colony pieces are maintained in contact with water until substantially all of the C–15 acetates of the prostanoic acid derivatives originally present in the colonies or colony pieces are transformed to C–15 hydroxy prostanoic acid derivatives, they are cooled to a temperature at least as low as +5° C. prior to extraction.

5. A process improvement according to claim 1 wherein after the colonies or colony pieces are maintained in contact with water until substantially all of the C–15 acetates of the prostanoic acid derivatives originally present in the colonies or colony pieces are transformed to C–15 hydroxy prostanoic acid derivatives, said colonies or colony pieces are frozen and thawed prior to extraction.

6. A process improvement according to claim 1 wherein the marine invertebrate is *Plexaura homomalla* (Esper), 1792, forma S.

7. A process improvement according to claim 6 wherein the C–15 hydroxy prostanoic acid derivatives are $PGA_2$ and $PGA_2$ methyl ester.

8. A process improvement according to claim 1 wherein the marine invertebrate is *Plexaura homomalla* (Esper), 1792, forma R.

9. A process improvement according to claim 8 wherein the C–15 hydroxy prostanoic acid derivatives are $15\beta$-$PGA_2$ and $15\beta$-$PGA_2$ methyl ester.

10. A process improvement according to claim 1 wherein said temperature range is 20° to 40° C.

11. A process improvement according to claim 1 wherein the quantity of water contacting the colonies or colony pieces is at least equal in weight to the dry solids content of the colonies or colony pieces.

12. A process improvement according to claim 1 wherein the colonies or colony pieces of the marine invertebrate are maintained in contact with water in a temperature range of about 20° to 40° C. until substantially all of the C–15 acetates of the prostanoic acid derivatives originally present in the colonies or colony pieces are transformed to C–15 hydroxy prostanoic acid derivatives, said water being at least equal in weight to the dry solids content of the colonies or colony pieces, thereafter the colonies or colony pieces being frozen to and maintained in the temperature range of about −20° to −80° C. until thawed.

13. A process improvement according to claim 12 wherein the marine invertebrate is *Plexaura homomalla* (Esper), 1792, forma S.

14. A process improvement according to claim 12 wherein the marine invertebrate is *Plexaura homomalla* (Esper), 1792, forma R.

References Cited

Weinheimer et al., Tet Letters S185 (1969).

LORRAINE A. WEINBERGER, Primary Examiner

R. GERSTL, Assistant Examiner

U.S. Cl. X.R.

260—348 A, 448.8 RR, 488 R, 514 D; 424—305, 311, 317

UNITED STATES PATENT AND TRADEMARK OFFICE
CERTIFICATE OF CORRECTION

PATENT NO. : 3,794,675
DATED : February 26, 1974
INVENTOR(S) : Ramon D. Hamilton et al.

It is certified that error appears in the above-identified patent and that said Letters Patent are hereby corrected as shown below:

Column 3, lines 36-37, "1-5β-PGA$_2$" should read -- 15β-PGA$_2$ --. Column 5, line 65, "the acetate ester" should read -- acetate methyl ester --. Column 15, line 6, "$\overset{}{\underset{H\quad OH}{\diagup\diagdown}}$" should read -- $\overset{}{\underset{O\quad OH}{\diagup\diagdown}}$ --.
Column 17, lines 31-32, "1-β-PGA$_2$ acetate methyl ester" should read -- 15β-PGA$_2$ acetate methyl ester --; line 75, "1-β-PGF$_{2\alpha}$" should read -- 15β-PGF$_{2\alpha}$ --. Column 23, line 14, "resiue" should read -- residue --. Column 24, line 24, "in length frozen" should read -- in length and frozen --. Column 27, line 31, "contract" should read -- contact --.

Signed and Sealed this

Twenty-seventh Day of July 1976

[SEAL]

Attest:

RUTH C. MASON
*Attesting Officer*

C. MARSHALL DANN
*Commissioner of Patents and Trademarks*